US008069270B1

(12) United States Patent
Nambiar et al.

(10) Patent No.: US 8,069,270 B1
(45) Date of Patent: Nov. 29, 2011

(54) ACCELERATED TAPE BACKUP RESTORATION

(75) Inventors: Manali Nambiar, San Diego, CA (US); Arpakorn Boonkongchuen, San Jose, CA (US); P. Murali Basavaiah, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 620 days.

(21) Appl. No.: 11/220,490

(22) Filed: Sep. 6, 2005

(51) Int. Cl.
*G06F 3/00* (2006.01)
*G06F 13/00* (2006.01)

(52) U.S. Cl. ............ 710/5; 711/137; 711/213; 712/207; 712/237

(58) Field of Classification Search .................. 710/5
See application file for complete search history.

(56) References Cited

U.S. PATENT DOCUMENTS

| | | | | |
|---|---|---|---|---|
| 4,423,480 A | * | 12/1983 | Bauer et al. ................ | 710/100 |
| 4,428,064 A | * | 1/1984 | Hempy et al. .............. | 711/113 |
| 4,435,762 A | * | 3/1984 | Milligan et al. ............ | 710/6 |
| 4,932,826 A | * | 6/1990 | Moy et al. .................. | 414/277 |
| 5,016,277 A | | 5/1991 | Hamilton | |
| 5,347,648 A | * | 9/1994 | Stamm et al. .............. | 714/5 |
| 5,692,124 A | | 11/1997 | Holden et al. | |
| 5,758,151 A | * | 5/1998 | Milligan et al. ........... | 707/100 |
| 5,765,213 A | * | 6/1998 | Ofer ........................... | 711/213 |
| 5,809,328 A | | 9/1998 | Nogales et al. | |
| 5,842,040 A | * | 11/1998 | Hughes et al. ............. | 710/11 |
| 5,892,915 A | * | 4/1999 | Duso et al. ................. | 709/219 |
| 5,930,344 A | | 7/1999 | Relyea et al. | |
| 6,026,468 A | * | 2/2000 | Mase et al. ................. | 711/111 |
| 6,049,546 A | | 4/2000 | Ramakrishnan | |
| 6,070,200 A | | 5/2000 | Gates et al. | |
| 6,141,728 A | * | 10/2000 | Simionescu et al. ....... | 711/113 |
| 6,148,421 A | | 11/2000 | Hoese et al. | |
| 6,172,250 B1 | | 1/2001 | Lawman et al. | |
| 6,178,244 B1 | | 1/2001 | Takeda et al. | |
| 6,219,728 B1 | | 4/2001 | Yin | |
| 6,317,819 B1 | | 11/2001 | Morton | |
| 6,327,253 B1 | | 12/2001 | Frink | |
| 6,381,665 B2 | | 4/2002 | Pawlowski | |
| 6,449,697 B1 | * | 9/2002 | Beardsley et al. .......... | 711/137 |
| 6,507,893 B2 | * | 1/2003 | Dawkins et al. ........... | 711/133 |
| 6,570,848 B1 | | 5/2003 | Loughran et al. | |
| 6,625,750 B1 | * | 9/2003 | Duso et al. ................. | 714/11 |
| 6,651,162 B1 | * | 11/2003 | Levitan et al. ............. | 712/238 |
| 6,658,540 B1 | | 12/2003 | Sicola et al. | |
| 6,751,758 B1 | * | 6/2004 | Alipui et al. ............... | 714/54 |
| 6,757,767 B1 | | 6/2004 | Kelleher | |
| 6,775,749 B1 | * | 8/2004 | Mudgett et al. ............ | 711/146 |
| 6,782,473 B1 | | 8/2004 | Park | |

(Continued)

OTHER PUBLICATIONS

"Affordable Remote Tape Backup/Restore via Tape Pipelining Over IP", CNT White Paper, pp. 1-8, Copyright 2003.*
StorageTek: The leader in Information lifecycle management solutions, http://www.storagetek.com, printed Aug. 4, 2005, p. 1.
"Affordable Remote Tape Backup/Restore via Tape Pipelining Over IP", CNT White Paper, pp. 1-8.

(Continued)

*Primary Examiner* — Henry W Tsai
*Assistant Examiner* — Michael Sun
(74) *Attorney, Agent, or Firm* — Weaver Austin Villeneuve & Sampson LLP (57) ABSTRACT

According to the present invention, methods and apparatus are provided improving reading of a remote tape device by a host through multiple fibre channel switches. A fibre channel switch preemptively sends read requests to a tape device before read requests are received from a host. Flow control, buffer management, and error handling mechanisms are implemented to allow accelerated tape back up restoration while working to prevent buffer overflow and underflow.

25 Claims, 8 Drawing Sheets

U.S. PATENT DOCUMENTS

| | | | |
|---|---|---|---|
| 6,788,680 B1 | 9/2004 | Perlman et al. | |
| 6,791,989 B1 | 9/2004 | Steinmetz et al. | |
| 6,880,062 B1 | 4/2005 | Ibrahim et al. | |
| 6,941,429 B1 | 9/2005 | Kamvysselis et al. | |
| 7,000,025 B1 | 2/2006 | Wilson | |
| 7,065,582 B1 | 6/2006 | Dwork et al. | |
| 7,165,180 B1 | 1/2007 | Ducharme | |
| 7,181,578 B1 | 2/2007 | Guha et al. | |
| 7,219,237 B1 | 5/2007 | Trimberger | |
| 7,237,045 B2 | 6/2007 | Beckmann et al. | |
| 7,290,236 B1 | 10/2007 | Flaherty et al. | |
| 7,295,519 B2 | 11/2007 | Sandy et al. | |
| 7,397,764 B2 | 7/2008 | Cherian et al. | |
| 7,411,958 B2 | 8/2008 | Dropps et al. | |
| 7,414,973 B2 | 8/2008 | Hart et al. | |
| 7,415,574 B2 * | 8/2008 | Rao et al. | 711/118 |
| 7,436,773 B2 | 10/2008 | Cunningham | |
| 7,472,231 B1 * | 12/2008 | Cihla et al. | 711/144 |
| 7,568,067 B1 * | 7/2009 | Mase et al. | 711/111 |
| 7,583,597 B2 | 9/2009 | Dropps et al. | |
| 7,617,365 B2 | 11/2009 | Zhang et al. | |
| 2001/0016878 A1 | 8/2001 | Yamanaka | |
| 2002/0024970 A1 | 2/2002 | Amaral et al. | |
| 2002/0059439 A1 | 5/2002 | Arroyo et al. | |
| 2002/0169521 A1 * | 11/2002 | Goodman et al. | 700/245 |
| 2003/0021417 A1 | 1/2003 | Vasic et al. | |
| 2003/0065882 A1 * | 4/2003 | Beeston et al. | 711/111 |
| 2003/0093567 A1 * | 5/2003 | Lolayekar et al. | 709/246 |
| 2003/0185154 A1 * | 10/2003 | Mullendore et al. | 370/230 |
| 2004/0010660 A1 * | 1/2004 | Konshak et al. | 711/114 |
| 2004/0081082 A1 | 4/2004 | Moody et al. | |
| 2004/0088574 A1 | 5/2004 | Walter et al. | |
| 2004/0148376 A1 | 7/2004 | Rangan et al. | |
| 2004/0153566 A1 | 8/2004 | Lalsangi et al. | |
| 2004/0158668 A1 | 8/2004 | Golasky et al. | |
| 2004/0160903 A1 | 8/2004 | Gai et al. | |
| 2004/0170432 A1 | 9/2004 | Reynolds et al. | |
| 2004/0202073 A1 * | 10/2004 | Lai et al. | 369/47.33 |
| 2005/0021949 A1 | 1/2005 | Izawa et al. | |
| 2005/0031126 A1 | 2/2005 | Edney et al. | |
| 2005/0114663 A1 | 5/2005 | Cornell et al. | |
| 2005/0117522 A1 | 6/2005 | Basavaiah et al. | |
| 2005/0144394 A1 * | 6/2005 | Komarla et al. | 711/137 |
| 2005/0192923 A1 | 9/2005 | Nakatsuka | |
| 2006/0039370 A1 | 2/2006 | Rosen et al. | |
| 2006/0059313 A1 * | 3/2006 | Lange | 711/138 |
| 2006/0059336 A1 | 3/2006 | Miller et al. | |
| 2006/0112149 A1 * | 5/2006 | Kan et al. | 707/201 |
| 2006/0126520 A1 | 6/2006 | Nambiar et al. | |
| 2006/0248278 A1 * | 11/2006 | Beeston et al. | 711/137 |
| 2007/0101134 A1 | 5/2007 | Parlan et al. | |

OTHER PUBLICATIONS

U.S. Appl. No. 11/015,383, filed Dec. 15, 2005.
U.S. Office Action dated Apr. 2, 2009 from U.S. Appl. No. 11/015,383, 16 pgs.
Forouzan et al., "TCP/IP Protocol Suite", 2002, McGraw-Hill Professional, Second Edition, Section 12.4, pp. 305-308.
Austin Modine, "HP adds Encryption Gear for Storage Systems, Tape and Virtual Tape get Algorithmic," The Register, printed on Apr. 28, 2009 from URL: http://www.theregister.co.uk/2008/04/04/hp_storage_encryption_add_ons, 2 pgs.
Cisco MDS 9000 Intelligent Fabric Applications, "Fibre Channel Write Acceleration" printed on Apr. 28, 2009 from website: http://www.cisco.com/en/US/prod/collateral/ps4159/ps6409/ps5989/ps6217/prod_white_paper, 7 pgs.
Viega J. et al., Network Working Group, "The use of Galois/Counter mode (GMC) in Ipsec Encapsulating Security Payload (ESP)," RFC 4106, Secure Software, Inc., Jun. 2005, 16 pgs.
ISR and Written Opinion dated Mar. 26, 2008 from related PCT Application No. PCT/US06/42477.
U.S. Final Office Action dated Oct. 16, 2009 from U.S. Appl. No. 11/015,383.
U.S. Office Action dated Mar. 18, 2009 from related U.S. Appl. No. 11/264,191.
U.S. Final Office Action dated Sep. 9, 2009 from U.S. Appl. No. 11/264,191.
U.S. Office Action dated Jan. 25, 2010, from U.S. Appl. No. 11/264,191.
StorageTek: The leader in Information lifecycle management solutions, http://www.storagetek.com, printed Aug. 4, 2005, p. 1.
U.S. Appl. No. 11/015,383 filed Aug. 24, 2010.
U.S. Final Office Action dated Jul. 26, 2010 from U.S. Appl. No. 11/264,191.
CN First Office Action dated Jan. 26, 2011, from CN Appl. No. 200680023522.7.
U.S. Final Office Action dated Dec. 23, 2010, U.S. Appl. No. 11/015,383.
U.S. Office Action dated Mar. 4, 2011 from U.S. Appl. No. 11/264,191.
U.S. Final Office Action dated Aug. 31, 2011 from U.S. Appl. No. 11/264,191.
U.S. Non-Final Office Action dated May 6, 2011 from U.S. Appl. No. 11/015,383.
CN Office Action dated Aug. 2, 2011, Application No. 200680023522.7.
U.S. Final Office Action dated Sep. 14, 2011 from U.S. Appl. No. 11/015,383.

* cited by examiner

ACCELERATED TAPE BACKUP RESTORATION

CROSS-REFERENCE TO RELATED APPLICATIONS

The present application is related to filed U.S. patent application Ser. No. 11/015,383, titled Tape Acceleration by Manali Nambiar, Arpakorn Boonkongchuen, Murali Busavaiah, and Stephen Degroote and filed on Dec. 15, 2004, the entirety of which is incorporated by reference herein for all purposes.

BACKGROUND OF THE INVENTION

1. Field of the Invention

The present invention generally relates to Storage Area Networks (SANs). More specifically, the present invention provides techniques and mechanisms for improving data reads between hosts and end devices connected to SANs.

2. Description of Related Art

Storage Area Networks (SANs) provide an effective mechanism for maintaining and managing large amounts of data. A host can obtain data from a device such as a tape device through a fibre channel fabric having a number of fibre channel switches. However, storage area networks are often limited in geographic scope. Fibre channel fabrics in different geographic areas or separate fibre channel fabrics often have limited ability to interoperate.

Protocols such as Fibre Channel over the Internet Protocol (FCIP) allow devices on different fibre channel fabrics to communicate. FCIP is one protocol that allows the creation of a wide area network (WAN) connecting hosts and tape resources. For example, two separate fibre channel fabrics may be connected through an IP network. A host device on a first fibre channel fabric can read data from a device on a second fibre channel fabric through the IP network. However, reading data over an IP network from a separate fibre channel network can often be inefficient. Round trip times for commands and data can often introduce high latency into various storage applications, such as tape backup restore applications.

Consequently, it is desirable to provide improved techniques for efficiently and effectively reading data from remote tape device connected to a host through fibre channel switches in a wide area network.

SUMMARY OF THE INVENTION

According to the present invention, methods and apparatus are provided improving reading of a remote tape device by a host through multiple fibre channel switches. A fibre channel switch preemptively sends read requests to a tape device before read requests are received from a host. Flow control, buffer management, and error handling mechanisms are implemented to allow accelerated tape back up restoration while working to prevent buffer overflow and underflow.

In one embodiment, a technique implementing read acceleration is provided. A first read command is received from a host for a first data block on a tape device. The first read command is received at a first fibre channel switch. The first read command is forwarded to the tape device. The first data block is received from the tape device. The first data block is associated with the first read command. A second data block is received from the tape device. The second data block is associated with a second read command. The second data block is received after an anticipatory read of the tape device. The second read command is received from the host for the second data block on the tape device. The second data block is provided to the host before forwarding the second read command to the tape device.

In another embodiment, a fibre channel switch for implementing read acceleration is provided. The fibre channel switch includes an Internet Protocol (IP) interface and a fibre channel interface. The Internet Protocol (IP) interface is configured to receive a first read command and a second read command for a first data block and a second data block on a tape device. The IP interface is configured with a fibre channel over IP tunnel. The fibre channel interface is configured to forward the first read command and send an anticipatory read command to the tape device before the second read command is received and receive the first data block and the second data block from the tape device.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of storage area networks and tape devices. However, it should be noted that the techniques of the present invention can be applied to a variety of different standards and variations to storage area networks and tape devices. Similarly, a server is described throughout. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted. In addition, a block of data is described in several contexts. A block of data may include multiple data blocks or data sets.

Hosts often need to read data from remote tape devices. In one example, the host and the remote tape device area connected over a wide area network (WAN) that introduces substantial latency into communications between the devices. Furthermore, a variety of systems require that a host send a command to read one or more blocks of data only after a response to a prior command has been received. Hence the latency introduced by a wide area network (WAN) can make tape backup restore applications and bulk data transfer operations highly inefficient for such systems.

Consequently, the techniques of the present invention provide mechanisms for performing read acceleration or read aheads. In one example, a host is connected to a tape device through at least a host end fibre channel switch and a tape device end fibre channel switch. Any switch located near a host is referred to herein as a host end fibre channel switch. Any switch located near a tape device is referred to herein as a tape device end fibre channel switch. Data is anticipatorily read by a tape device end fibre channel switch from a tape device and buffered at a host end fibre channel switch based on received read commands.

A read ahead window or flow control window is maintained to decrease the likelihood of buffer overflow or underflow at a host end fibre channel switch. The read ahead window is used to control the number of read aheads a tape device end fibre channel switch will perform. In one example, the read ahead window size is dynamic. The host end fibre channel switch sends a control message to the tape device end fibre channel switch to increase the window size if read ahead buffered data is not yet available upon receiving a read command from a host. Error handling and rewind mechanisms are also provided to allow efficient operation in the event that non-read commands or errors are received.

Figure 1:
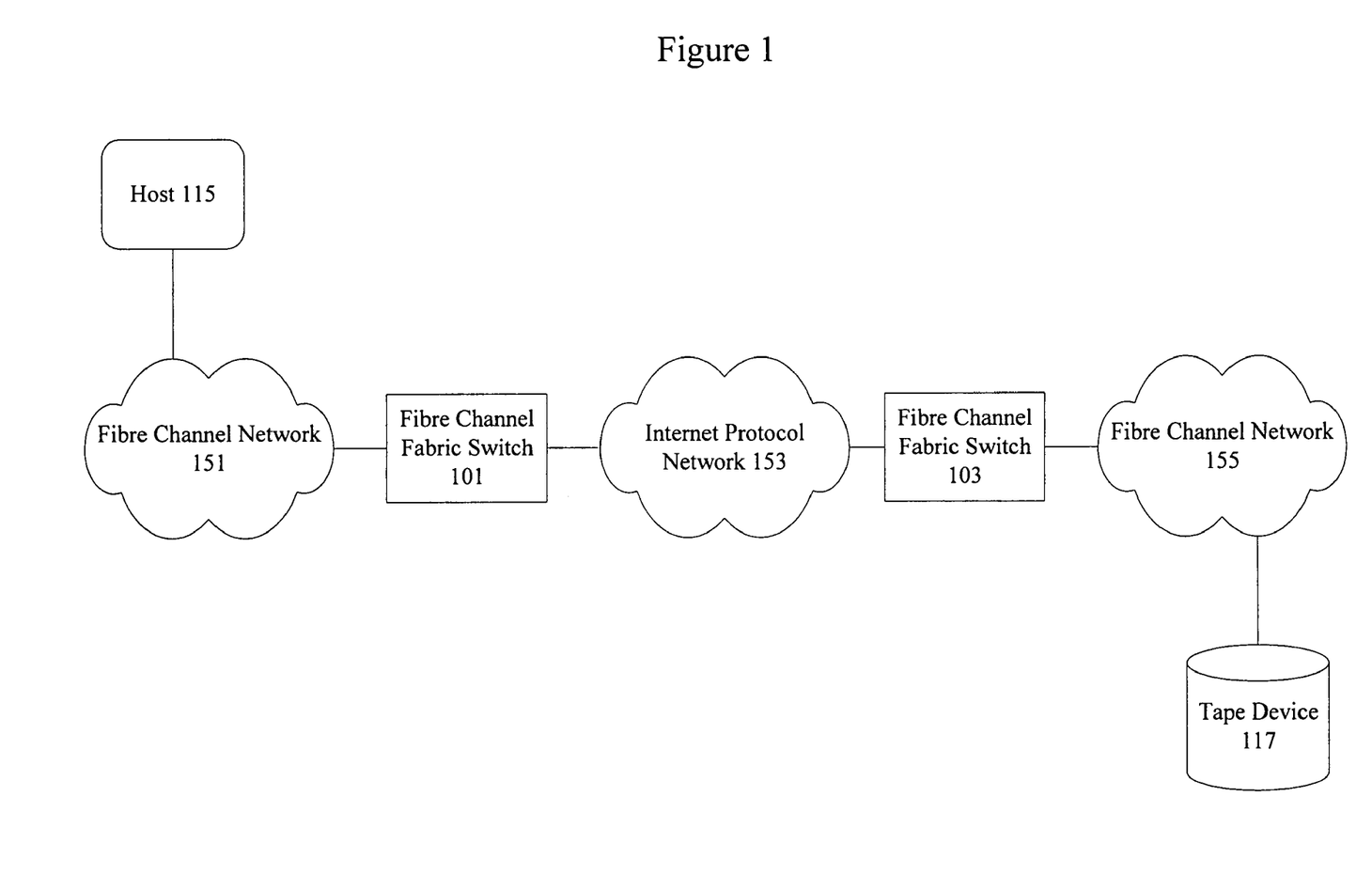
FIG. 1 is a diagrammatic representation showing a system that can use the techniques of the present invention.

FIG. 1 is a diagrammatic representation showing one example of a system that can use the techniques of the present invention. A WAN based storage area network often includes multiple networks. In one example, multiple fibre channel networks are often interconnected through widely available Internet protocol (IP) networks such as the Internet. For example, fibre channel network 151 is connected to Internet protocol network 153 using a fibre channel fabric switch 101. In one example, switch 101 is a host end switch and switch 103 is a tape device end switch. The fibre channel fabric switch 101 includes a fibre channel interface as well as an Internet protocol interface. Fibre channel network 155 is also connected to Internet protocol network 153 through a fibre channel fabric switch 103. The fibre channel fabric switch 103 also includes a fibre channel network interface and an Internet protocol interface. The host 115 is connected to fibre channel network 151 and tape device 117 is connected to fibre channel network 155.

In one example, a host 115 sends commands to a tape device 117 through the fibre channel network 151, the Internet protocol network 153, and the fibre channel network 155. According to various embodiments, the fibre channel fabric switch 101 establishes a tunnel through the Internet protocol network 153 with fibre channel fabric switch 103. Fibre channel fabric switches 101 and 103 are referred to herein as tunnel end points.

However, sending commands and data through multiple networks such as fibre channel network 151, an Internet protocol network 153, and a fibre channel network 155 can cause high latency and poor round trip times. A host 115 would not be able to efficiently read data from a tape device 117. In a standard such as SCSI (Small Computer Systems Interface) stream commands for tape devices, only one command can be issued at a time. For each command to complete, the host 115 needs to first receive a response from the tape device 117. For example, in order for a host to issue multiple read commands for multiple blocks of data, the host must wait for the data and status messages from a tape device for the first read command to be received before the host can send a second read command. This wait can cause a delay of at least one round trip time for every command.

In some instances, a fibre channel fabric switch 103 preemptively or anticipatorily sends a read command to a tape device 117 as soon as a status response is returned from a tape device 117 for the previous read. For example, a fibre channel fabric switch 103 can send a read command as soon as it is determined that the host is in streaming mode. Instead of waiting for additional read commands from a host 115, data is anticipatorily read by switch 103 and buffered at a switch 101 so that the switch 101 can rapidly respond to expected subsequent read requests from the host 115.

In one example, flow control problems can occur if a fibre channel fabric switch 103 preemptively sends too much data to switch 101. The additional data may end up getting buffered with the risk of buffer overflow. In this example, it is desirable to limit the number of read commands sent by a switch 103 to prevent buffer overflow. The present invention dynamically adjusts the buffering to account for particular network and device characteristics. Consequently, techniques and mechanisms of the present invention allow for flow control to intelligently monitor the amount of data being read.

Similarly, preemptively or anticipatorily reading data from a tape device 117 can cause a fibre channel fabric switch 103 to have already read data that eventually may not be requested. A tape device would then have to be rewound and a switch 101 buffer would have to be flushed. Errors may also be received while doing anticipatory reads for data which has not yet been read by the host. Consequently, techniques and mechanisms of the present invention provide error handling mechanisms to allow anticipatory reads while accounting for possible error scenarios.

Figure 2:
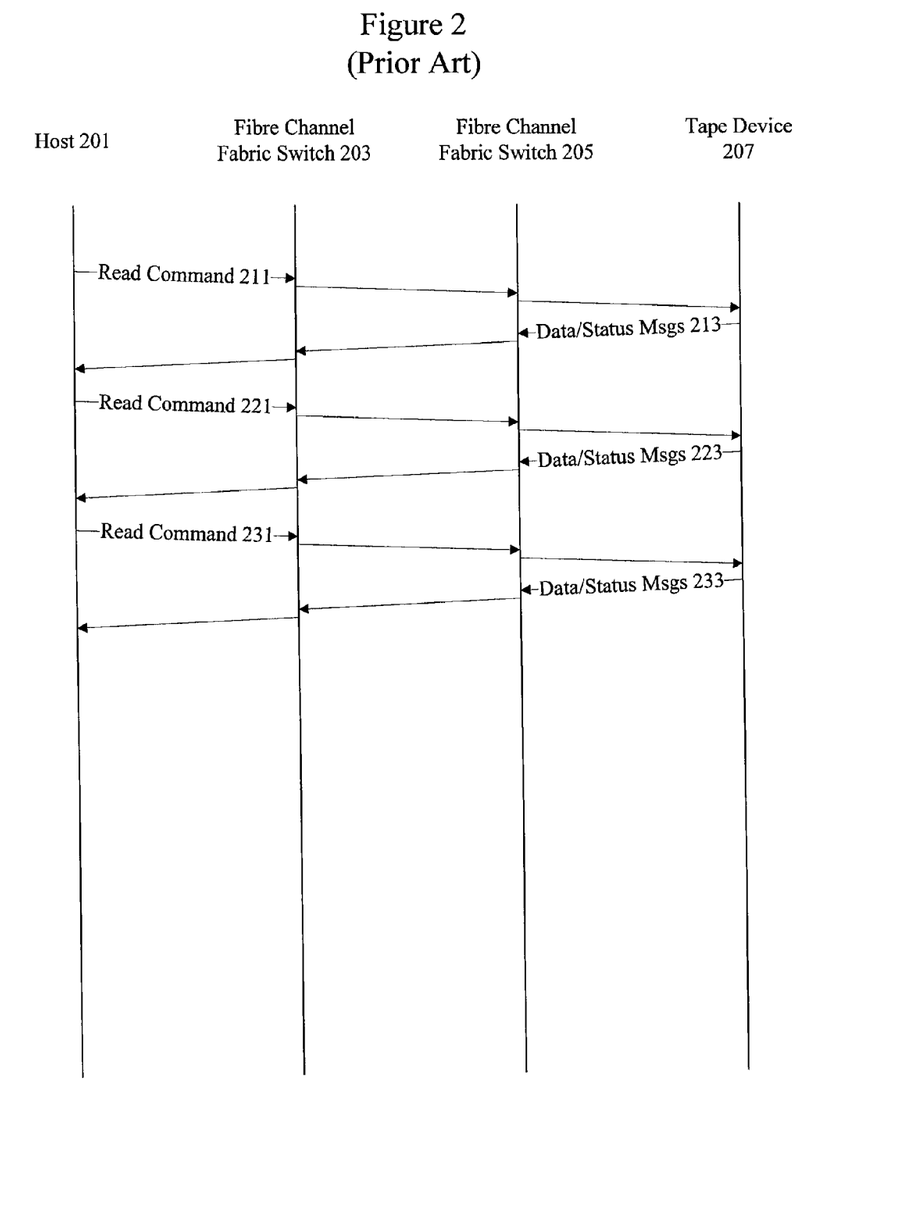
FIG. 2 is an exchange diagram showing a read transaction.

FIG. 2 is an exchange diagram showing one example of a typical tape device read. In this example a read of one block of data is shown, but in some embodiments the read could be for multiple blocks of data. A host 201 sends a read command 211 to a fibre channel fabric switch 203. According to various embodiments, fibre channel fabric switches 203 and 205 are host end and tape device end switches operating as gateways between fibre channel and IP networks. The fibre channel fabric switches 203 and 205 serve as fibre channel over IP (FCIP) tunneling endpoints. The fibre channel fabric switch 203 forwards the read command to the fibre channel switch 205. The fibre channel switch 205 forwards the read command to the tape device 207. The tape device performs a read on a block of data and returns data along with possibly other messages such as status messages 213. The fibre channel switch 205 forwards the data and status messages 213 to the fibre channel switch 203.

The fibre channel switch 203 in turn sends the data and status messages to the host 201. Because the host 201 is accessing the tape device 207 over a network having less than ideal round trip times, reading a block of data can take a non negligible amount of time. Many storage area networks require that data and status messages be received before a host 201 can issue another read command. Consequently, the read command 221 for another block of data is held until a response to read command 211 is received. Read command 221 is similarly forwarded from host 201 through fibre channel switches 203 and 205 to a tape device 207. The data and status response 223 is returned through switches 205 and 203 to the host 201. The host 201 can then issue another read command 231 for the next block of data to the tape device 207 for data and status messages 233.

Applications such as tape backup restore applications that require a large number of data blocks can suffer performance limitations because of the latency of the IP network. Consequently, the techniques and mechanisms of the present invention provide acceleration of read commands.

Figure 3:
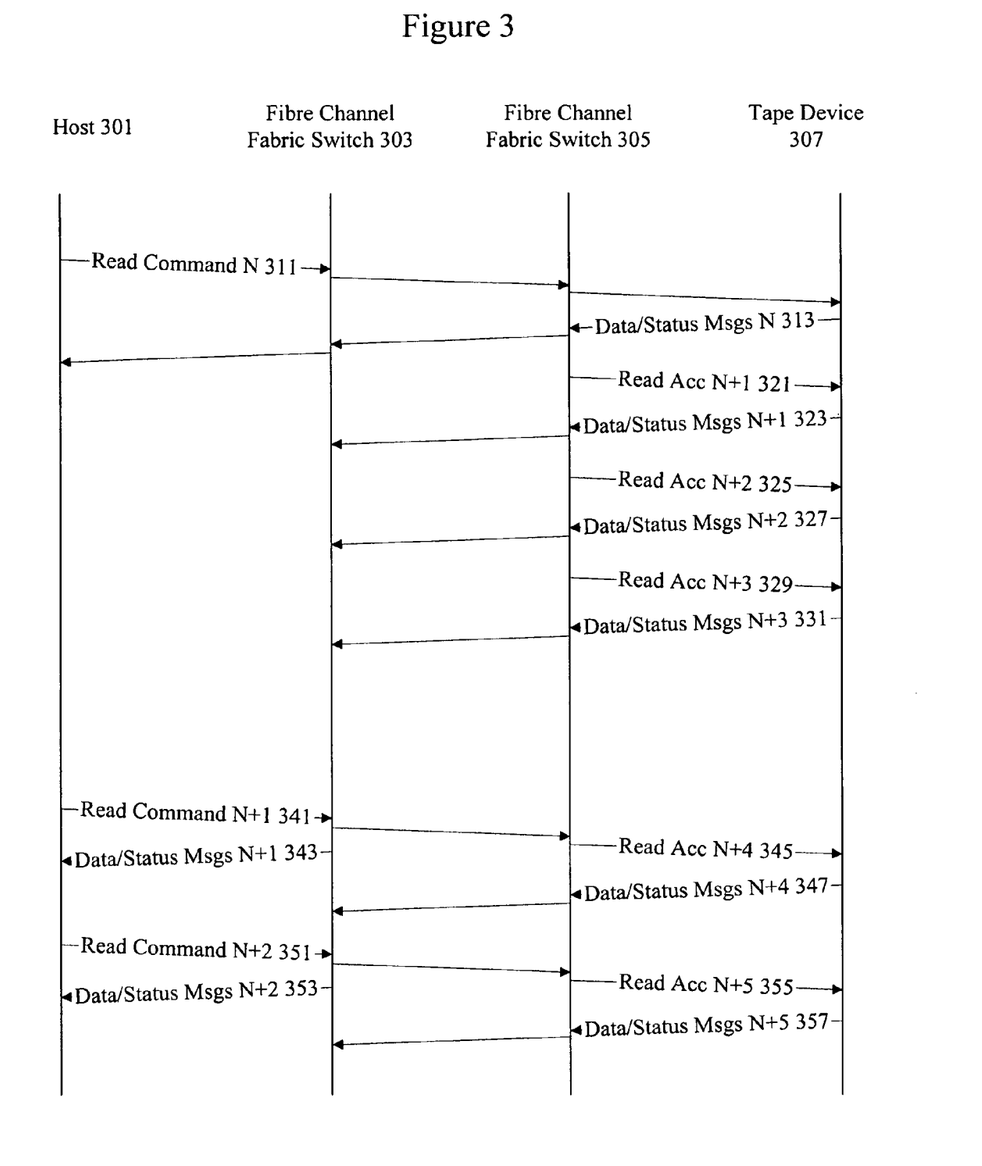
FIG. 3 is an exchange diagram depicting read acceleration.

FIG. 3 is an exchange diagram showing one example of tape read acceleration. In this example a read of one block of data is shown, but in some embodiments the read could be for multiple blocks of data. In one embodiment, tape device reads are requested by a tape device end switch before read requests are received from a host.

According to various embodiments, a host 301 sends a read command 311 to a fibre channel fabric switch 303. According to various embodiments, fibre channel fabric switches 303 and 305 are gateways between fibre channel and IP networks. The fibre channel fabric switches 303 and 305 serve as fibre channel over IP (FCIP) tunneling endpoints. The fibre channel fabric switch 303 forwards the read command to the fibre channel switch 305. The fibre channel switch 305 forwards the command 311 to the tape device. The tape device performs a read on a block of data and returns data along with possibly other messages such as status messages 313. The fibre channel switch 305 forwards the data and status messages 313 to the fibre channel switch 303.

The fibre channel switch 303 in turn sends the data and status messages to the host 301. However, the fibre channel switch 305 determines that read acceleration can be performed and does not wait for subsequent read commands, for example, read command N+1, N+2, or read command N+3 to arrive from a host 301. To perform read acceleration, the fibre channel switch 305 makes anticipatory reads or read aheads of blocks N+1, N+2, and N+3 using read acceleration commands 321, 325, and 329. In one embodiment the fibre channel switch 305 makes anticipatory reads if flow control is not being enforced. The data and status messages for N+1, N+2, and N+3, respectively 323, 327, and 331, are forwarded from fibre channel switch 305 and buffered at fibre channel switch 303. In one embodiment the fibre channel switch 305 determines that flow control is being enforced and so does not send out an anticipatory read N+4 345. According to various embodiments, the fibre channel switch 305 keeps the number of the blocks it has read ahead. In one embodiment, the fibre channel switch 303 keeps the actual block data.

When a read command N+1 341 is received from the host 301 at a fibre channel switch 303, the data is already available and the data N+1 343 is promptly sent to the host 301. The switch 303 also forwards the read command N+1 341 to the fibre channel switch 305. Upon receiving the read command N+1, the fibre channel switch 305 recognizes that the buffer for block N+1 has been cleared and there is no flow control and that an additional block can now be read. The fibre channel switch 305 is free to obtain an additional block using read command N+4 345. The data block N+4 347 is forwarded from the fibre channel switch 305 and buffered at switch 303.

When a read command N+2 351 is received from the host 301 at a fibre channel switch 303, the data is already available and the data N+2 353 is promptly sent to the host 301. The switch 303 also forwards the read command N+2 351 to the fibre channel switch 305. Upon receiving the read command N+2, the fibre channel switch 305 recognizes that the buffer for block N+2 has been cleared and that an additional block can now be read. The fibre channel switch 305 is free to obtain an additional block using read command N+5 355. The data block N+5 357 is forwarded from the fibre channel switch 305 and buffered at switch 303.

Figure 4:
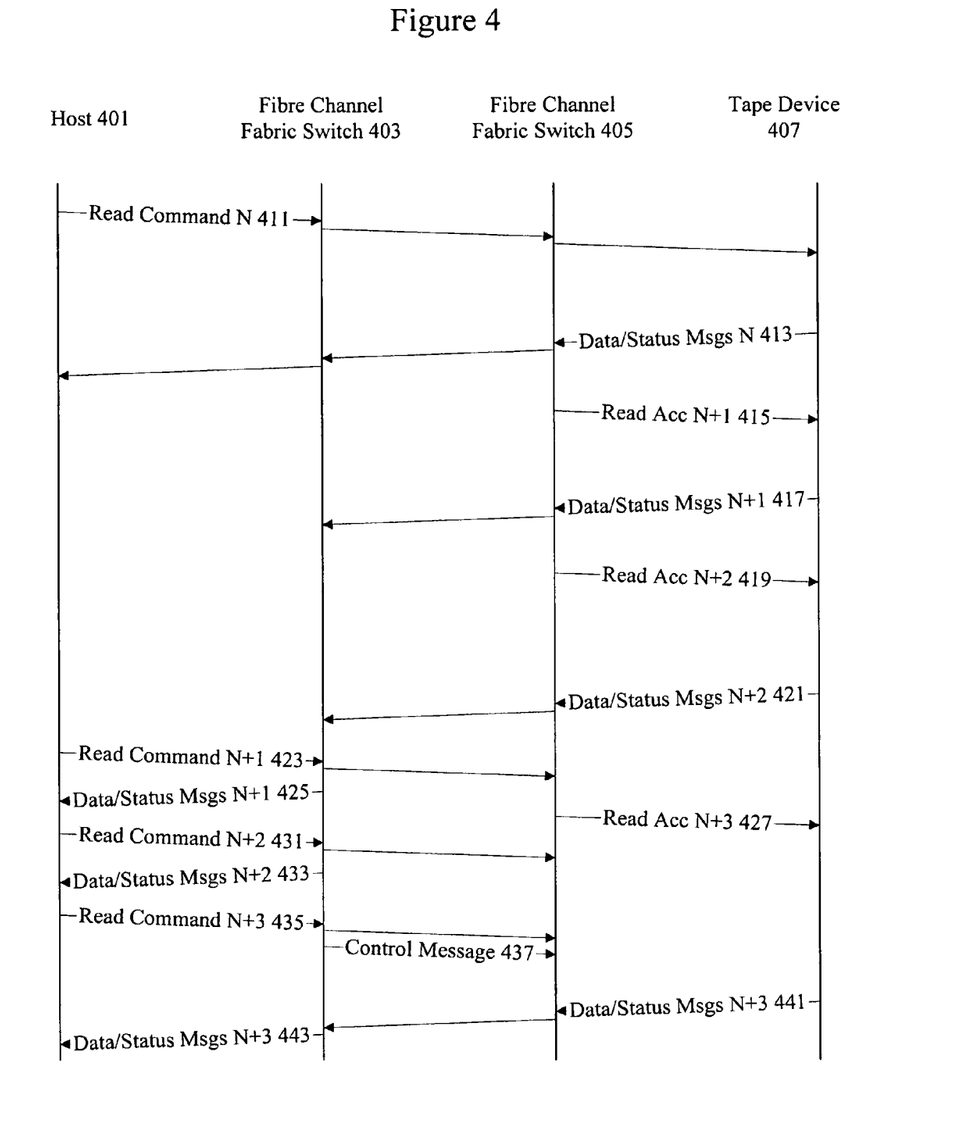
FIG. 4 is an exchange diagram showing read acceleration and increasing the size of a sliding read window.

FIG. 4 is an exchange diagram showing one example of tape read acceleration with an increase in window size. In this example a read of one block of data is shown, but in some embodiments the read could be for multiple blocks of data. In one embodiment, an attempt is made to perform as much read ahead as is necessary to keep the tape streaming. If too much data is read ahead of time, too much data may be buffered putting a strain on switch resources. However, if too little data is read, a host may have to wait unnecessarily long for a data block. Consequently, the techniques of the present invention contemplate measuring round trip times or monitoring read commands in order to adjust read window sizes.

According to various embodiments, a host 401 sends a read command 411 to a fibre channel fabric switch 403. According to various embodiments, fibre channel fabric switches 403 and 405 are gateways between fibre channel and IP networks. The fibre channel fabric switches 403 and 405 serve as fibre channel over IP (FCIP) tunneling endpoints. The fibre channel fabric switch 403 forwards the read command to the fibre channel switch 405. The fibre channel switch 405 forwards the command 411 to the tape device. The tape device performs a read on a block of data and returns data along with possibly other messages such as status messages 413. The fibre channel switch 405 forwards the data and status messages 413 to the fibre channel switch 403.

The fibre channel switch 403 in turn sends the data and status messages to the host 401. However, the fibre channel switch 405 determines that read acceleration can be performed and does not wait for subsequent read commands, for example, read command N+1 or read command N+2 to arrive from a host 401. To perform read acceleration, the fibre channel switch 405 makes anticipatory reads or read aheads of blocks N+1 and N+2 using commands read acceleration 415 and 419. The data and status messages for N+1 and N+2, respectively 417 and 421 are forwarded from fibre channel switch 405 and buffered at fibre channel switch 403. The fibre channel switch 405 keeps track of what blocks it has read ahead. According to various embodiments, the fibre channel switch 405 keeps the number of blocks it has read. In one embodiment, the fibre channel switch 403 keeps the actual block data.

When a read command N+1 441 is received from the host 401 at a fibre channel switch 403, the data is already available and the data N+1 443 is promptly sent to the host 401. The switch 403 also forwards the read command N+1 441 to the fibre channel switch 405. Upon receiving the read command N+1, the fibre channel switch 405 recognizes that the buffer for block N+1 has been cleared and that an additional block can now be read. The fibre channel switch 405 is free to obtain an additional block using read command N+3 427. The data block N+3 441 is forwarded from the fibre channel switch 405 and buffered at switch 403. However, before the data block N+3 441 has arrived at a fibre channel switch 403, the switch 403 has already received the read commands for N+2 and N+3, 431 and 435 respectively. The data block N+2 433 was already available. However, the data block N+3 was not yet available, in some cases because of an insufficient buffering window size. Consequently, the fibre channel switch 403 not only forwards the read command N+3 435 but also sends a control message 437 to increase the window size. The fibre channel switch 405 can then increase its read ahead window size to allow for additional buffering.

In some other instances, the fibre channel switch may anticipate read commands inappropriately, and non read commands are received instead. In such a case, anticipatory read commands would have to be rolled back. A tape device would have to be rewound and buffers holding the read ahead data would have to be flushed.

Figure 5:
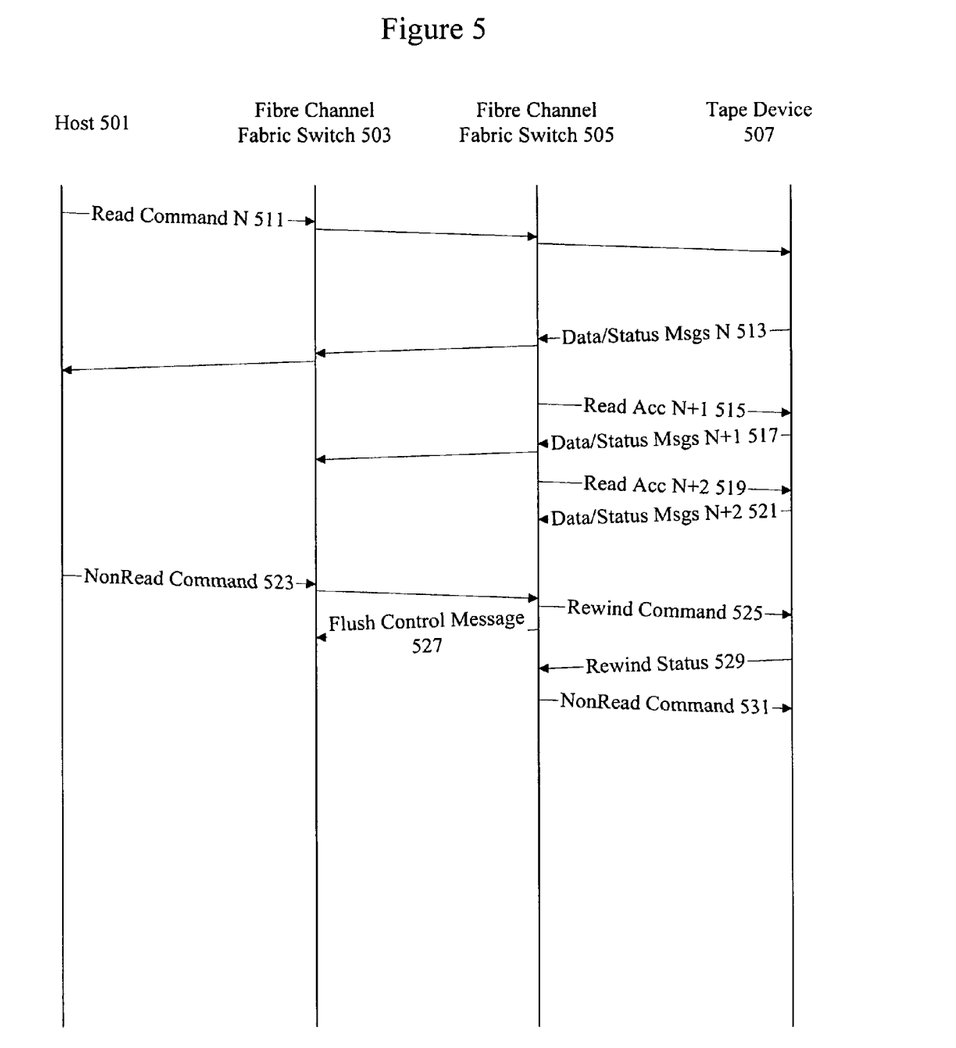
FIG. 5 is an exchange diagram depicting receipt of a non-read command.

FIG. 5 shows one example of non read command processing during read acceleration. In this example a read of one block of data is shown, but in some embodiments the read could be for multiple blocks of data. A host 501 sends a read command 511 to a fibre channel fabric switch 503. The fibre channel fabric switch 503 forwards the read command to the fibre channel switch 505. The fibre channel switch 505 forwards the command 511 to the tape device 507. The tape device performs a read on a block of data and returns data along with possibly other messages such as status messages 513. The fibre channel switch 505 forwards the data and status messages 513 to the fibre channel switch 503.

The fibre channel switch 503 in turn sends the data and status messages to the host 501. However, the fibre channel switch 505 determines that read acceleration can be performed and does not wait for subsequent read commands, for example, read command N+1 or read command N+2 to arrive from a host 501. To perform read acceleration, the fibre channel switch 505 makes anticipatory reads or read aheads of blocks N+1 and N+2 using commands read acceleration 515 and 519. The data and status messages for N+1 and N+2, respectively 517 and 521 are forwarded from fibre channel switch 505 and buffered at fibre channel switch 503. The fibre channel switch 505 keeps track of what blocks it has read ahead. According to various embodiments, the fibre channel switch 505 keeps the number blocks it has read. In one embodiment, the fibre channel switch 503 keeps the actual block data.

However, instead of receiving an expected N+1 read command, a non read command 523 is received at fibre channel switch 503. The non read command 523 is forwarded from fibre channel switch 503 to fibre channel switch 505. The fibre channel switch 505 then has to issue a rewind command 525 based on the number of blocks it has read ahead. In one instance, it rewinds the type by two data blocks with rewind command 525. The fibre channel switch 505 also sends a flush control message 527 to flush data blocks N+1 and N+2. Upon receiving a rewind status message 529, the fibre channel switch forwards the non read command 531 to the tape device and the process proceeds without acceleration.

Figure 6:
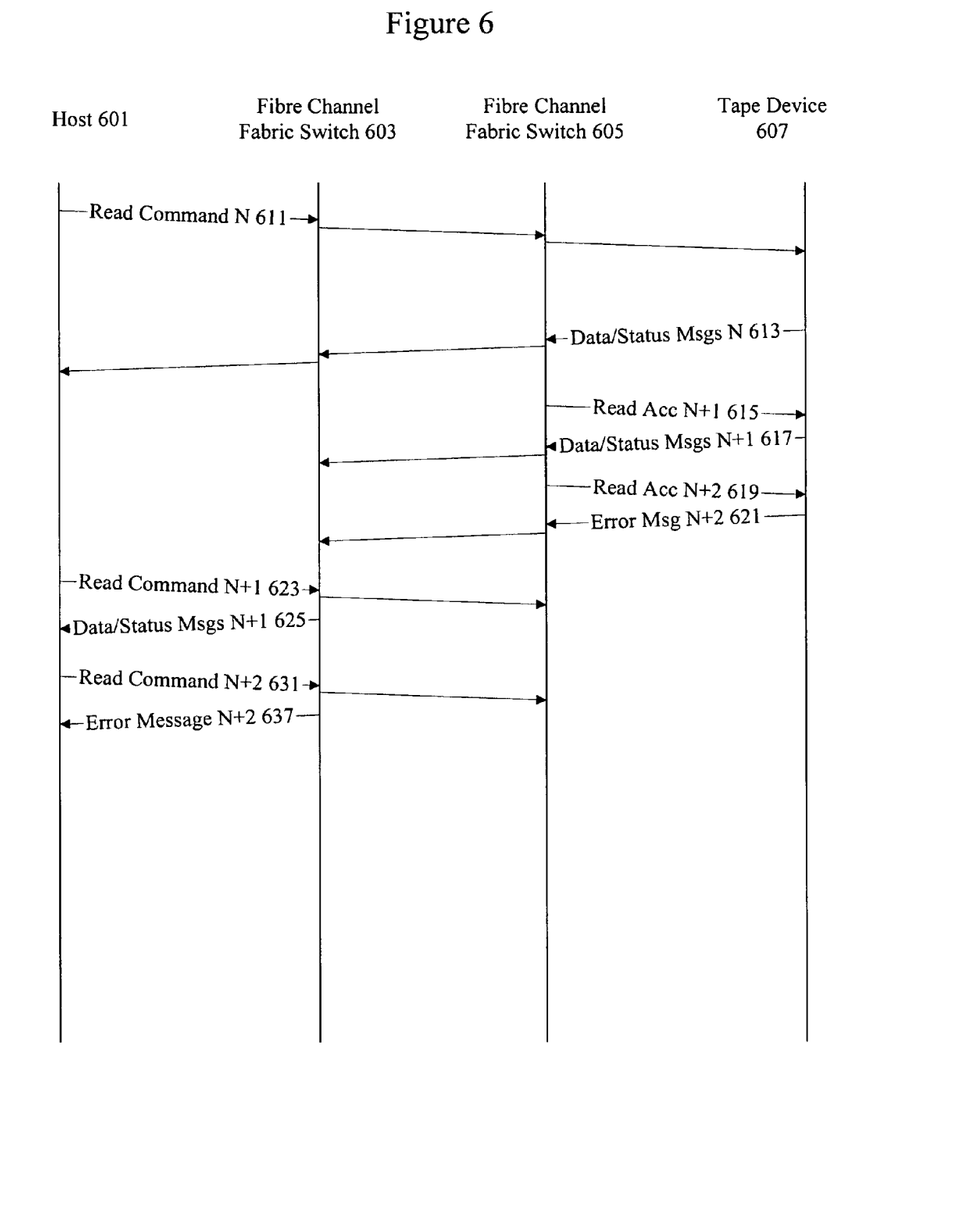
FIG. 6 is an exchange diagram showing error handling.

FIG. 6 is an exchange diagram showing one example of error handling. In this example a read of one block of data is shown, but in some embodiments the read could be for multiple blocks of data. A host 601 sends a read command 611 to a fibre channel fabric switch 603. The fibre channel fabric switch 603 forwards the read command to the fibre channel switch 605. The fibre channel switch 605 forwards the command 611 to the tape device 607. The tape device performs a read on a block of data and returns data along with possibly other messages such as status messages 613. The fibre channel switch 605 forwards the data and status messages 613 to the fibre channel switch 603.

The fibre channel switch 603 in turn sends the data and status messages to the host 601. It should be noted that many of the exchange diagram herein depict particular read commands. However, it should be noted that the techniques of the present invention apply during initial stream processing, mid stream processing, etc. The fibre channel switch 605 determines that read acceleration can be performed and does not wait for subsequent read commands, for example, read command N+1 or read command N+2 to arrive from a host 601. To perform read acceleration, the fibre channel switch 605 makes anticipatory reads or read aheads of blocks N+1 and N+2 using commands read acceleration 615 and 619. Although read acceleration commands are shown herein, the commands themselves may resemble mere read commands. The data and status message for N+1 617 is forwarded from fibre channel switch 605 and buffered at fibre channel switch 603. The fibre channel switch 605 keeps track of what blocks it has read ahead. According to various embodiments, the fibre channel switch 605 keeps the number of blocks it has read. In one embodiment, the fibre channel switch 603 keeps the actual block data. However, the tape device 607 responds to the read command 619 with an error message N+2 621.

According to various embodiments, a fibre channel switch 605 merely forwards the error message to fibre channel switch 603 without attempting another read command 633. In one example, the fibre channel switch 605 waits for the read command N+2 631 from the host 601. The read command N+1 623 is processed at fibre channel switch 603 and handled with read ahead data N+1 625. In one example, a read command N+2 631 is also processed at fibre channel switch 603 and the error message N+2 637 is sent to the host 601. In this manner an error encountered in an anticipatory read is presented to the host. It should be noted that in some instances, this may not happen and the tape may be rewound. In some other examples, the fibre channel switch can also forward the read command N+2 to trigger a read command N+2 without acceleration.

Figure 7:
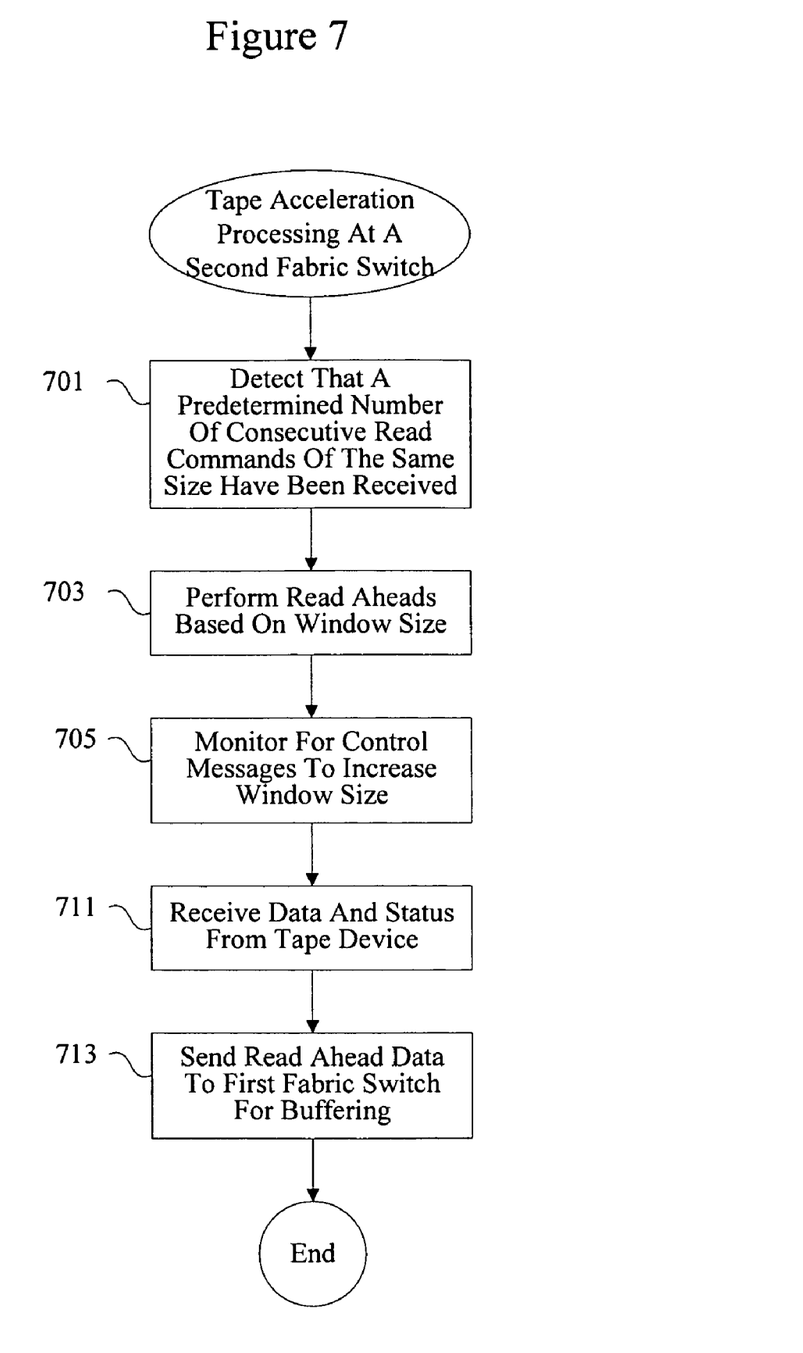
FIG. 7 is a flow process diagram showing one technique for performing read acceleration.

FIG. 7 is a flow process diagram showing one technique for performing tape acceleration. In this example a read of one block of data is shown, but in some embodiments the read could be for multiple blocks of data. At 701, a tape device end fibre channel switch determines that read aheads should now be performed. In some embodiments, this determination is made after the fibre channel switch detects that a predetermined number of consecutive read commands of the same size have been received from the same application. In one particular embodiment, read aheads are performed after four consecutive read commands for the same size block are received. At 703, read aheads are performed based on window size. The tape device end fibre channel switch also monitors for control messages indicating that a window size should be increased. In some instances, a window size may have to be increased if a host end fibre channel switch gets read commands before buffered data is available. In some instances, control messages to decrease window size are also provided. For example, a control message to decrease a window size may be sent from a host end fibre channel switch to a tape device end fibre channel switch if a host end fibre channel switch buffer is close to overflow. At 711, data and status messages are received from a tape device. Read ahead data is forwarded to a host end fibre channel switch for buffering at 713.

The techniques of the present invention can be implemented on a variety of network devices such as fibre channel switches and routers. In one example, the techniques of the present invention are implemented on the MDS 9000 series of fibre channel switches available from Cisco Systems of San Jose, Calif.

Figure 8:
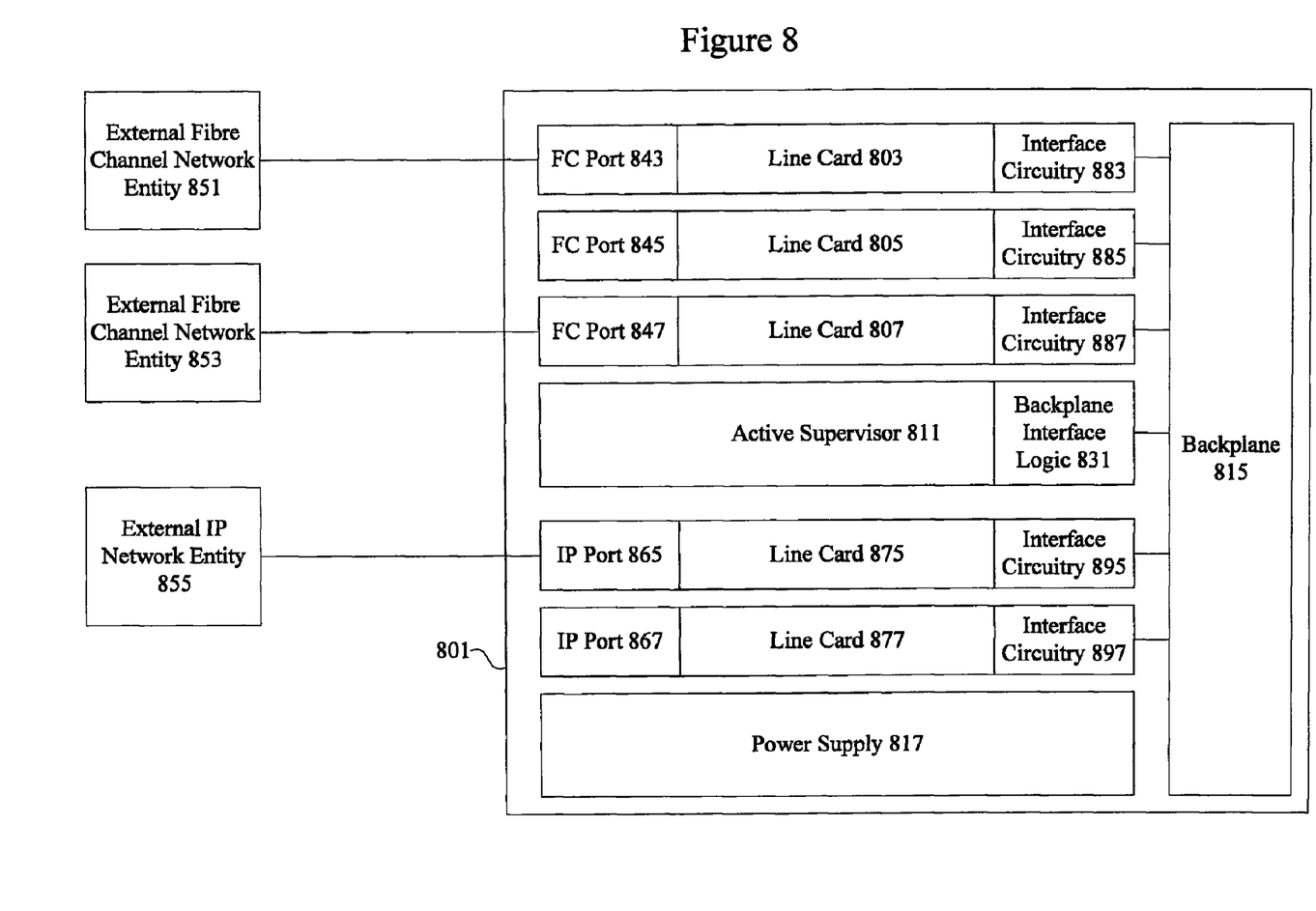
FIG. 8 is a diagrammatic representation showing one example of a fibre channel switch.

FIG. 8 is a diagrammatic representation of one example of a fibre channel switch that can be used to implement techniques of the present invention. Although one particular configuration will be described, it should be noted that a wide variety of switch and router configurations are available. The tunneling switch 801 may include one or more supervisors 811. According to various embodiments, the supervisor 811 has its own processor, memory, and storage resources.

Line cards 803, 805, and 807 can communicate with an active supervisor 811 through interface circuitry 883, 885, and 887 and the backplane 815. According to various embodiments, each line card includes a plurality of ports that can act as either input ports or output ports for communication with external fibre channel network entities 851 and 853. The backplane 815 can provide a communications channel for all traffic between line cards and supervisors. Individual line cards 803 and 807 can also be coupled to external fibre channel network entities 851 and 853 through fibre channel ports 843 and 847.

External fibre channel network entities 851 and 853 can be nodes such as other fibre channel switches, disks, RAIDS, tape libraries, or servers. It should be noted that the switch can support any number of line cards and supervisors. In the embodiment shown, only a single supervisor is connected to the backplane 815 and the single supervisor communicates with many different line cards. The active supervisor 811 may be configured or designed to run a plurality of applications such as routing, domain manager, system manager, and utility applications.

According to one embodiment, the routing application is configured to provide credits to a sender upon recognizing that a frame has been forwarded to a next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

According to various embodiments, the switch also includes line cards 875 and 877 with IP interfaces 865 and 867. In one example, the IP port 865 is coupled to an external IP network entity 855. The line cards 875 and 877 can also be coupled to the backplane 815 through interface circuitry 895 and 897.

According to various embodiments, the switch can have a single IP port and a single fibre channel port. In one embodiment, two fibre channel switches used to form an FCIP tunnel each have one fibre channel line card and one IP line card. Each fibre channel line card connects to an external fibre channel network entity and each IP line card connects to a shared IP network.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A method for implementing read acceleration, the method comprising:
receiving at a first fibre channel switch a first read command from a host for a first data block on a tape device;
forwarding the first read command to the tape device;
generating at the first fibre channel switch a second read command for a second data block on the tape device, the second read command being an anticipatory read command;
sending the second read command to the tape device;
receiving a first data block from the tape device, the first data block associated with the first read command;
sending the first data block to the host;
receiving a second data block from the tape device, the second data block associated with the second read command;
sending the second data block to the host,
wherein the second data block is stored in a buffer in a second fibre channel switch in the course of being transmitted to the host;
receiving a second command from the host, the second command being a non-read command or a read command not associated with the first read command; and
issuing at the first fibre channel switch or the second fibre channel switch a rewind command to the tape device, wherein the number of blocks rewound corresponds to the number of data blocks received after the first data block is received.

2. The method of claim 1, further comprising receiving N data blocks from the tape device, the N data blocks associated with N read commands, wherein the N data blocks are received after N anticipatory reads of the tape device.

3. The method of claim 2, wherein an anticipatory read window size is N.

4. The method of claim 1, wherein a second fibre channel switch resides between the first fibre channel switch and the host.

5. The method of claim 4, wherein the first fibre channel switch is coupled to the tape device and the second fibre channel switch is coupled to the host.

6. The method of claim 5, wherein the first and second fibre channel switches are connected through a fibre channel over IP tunnel.

7. The method of claim 1, wherein the second read command is generated after the first fibre channel switch determines that the corresponding data block would not cause the flow of data to the second fibre channel switch to exceed a predetermined buffering level.

8. The method of claim 7, wherein the second read command is generated after the first fibre channel switch receives a predetermined number of read commands of the same size from the same application.

9. The method of claim 1, wherein the second read command is generated after the first or the second fibre channel switch determines that the first read command is part of a streaming operation.

10. The method of claim 1, wherein an anticipatory read window size increases when a read command is received from the host before a corresponding data block is available.

11. A fibre channel switch for implementing read acceleration, the fibre channel switch comprising:
- an Internet Protocol (IP) interface configured to receive a first read command from a host for a first data block on a tape device, wherein the IP interface is configured with a fibre channel over IP tunnel;
- a fibre channel interface configured to
  - forward the first read command,
  - send a second read command to the tape device before a second read command is received,
  - receive a corresponding first data block and a corresponding second data block from the tape device, and
  - send the first data block and the second data block to the host,
  - wherein the fibre channel interface is further configured to send a rewind command to the tape device upon receiving a non-read command, or a read command not associated with the first read command, from the host after receiving the first read command,
  - wherein the tape device is rewound by a number of blocks corresponding to the number of data blocks received after the first data block is received from the tape device,
  - wherein the second data block is stored in a buffer in a second fibre channel switch in the course of being transmitted to the host; and
- a processor operable to
  - maintain error handling information including a second data block identifier to allow handling of non-read commands or second data block read errors, and
  - generate the second read command.

12. The fibre channel switch of claim 11, wherein the fibre channel interface is further configured to receive N data blocks from the tape device, the N data blocks associated with N read commands, wherein the N data blocks are received after N anticipatory reads of the tape device.

13. The fibre channel switch of claim 11, wherein the second read command is generated after the first fibre channel switch receives a predetermined number of read commands of the same size from the same application.

14. The fibre channel switch of claim 11, wherein the second read command is generated after the first fibre channel switch determines that the corresponding data block would not cause the flow of data to the second fibre channel switch to exceed a predetermined buffering level.

15. The fibre channel switch of claim 12, wherein a anticipatory read window size is N.

16. The fibre channel switch of claim 12, wherein the fibre channel switch is connected to the host end fibre channel switch through the IP interface and the fibre channel switch is connected to the tape device through the fibre channel interface.

17. The fibre channel switch of claim 16, wherein the second read command is generated after the first or the second fibre channel switch determines that the read commands are part of a streaming operation.

18. The fibre channel switch of claim 16, wherein an anticipatory read window size increases when a read command is received from the host before a corresponding data block is available.

19. A system for implementing read acceleration, the system comprising:
- means for receiving at a first fibre channel switch a first read command from a host for a first data block on a tape device;
- means for forwarding the first read command to the tape device;
- means for generating at the first fibre channel switch a second read command for a second data block on the tape device, the second read command being an anticipatory read command;
- means for sending the second read command to the tape device;
- means for receiving a first data block from the tape device, the first data block associated with the first read command;
- means for sending the first data block to the host;
- means for receiving a second data block from the tape device, the second data block associated with the second read command;
- means for sending the second data block to the host, wherein the second data block is stored in a buffer in a second fibre channel switch in the course of being transmitted to the host;
- means for receiving a second command from the host, the second command being a non-read command or a read command not associated with the first read command; and
- means for issuing at the first fibre channel switch or the second fibre channel switch a rewind command to the tape device, wherein the number of blocks rewound corresponds to the number of data blocks received after the first data block is received.

20. The system of claim 19, further comprising receiving N data blocks from the tape device, the N data blocks associated with N read commands, wherein the N data blocks are received after N anticipatory reads of the tape device.

21. The system of claim 20, wherein an anticipatory read window size is N.

22. The system of claim 19, wherein the first fibre channel switch and the second fibre channel switch reside between the host and the tape device.

23. The system of claim 22, wherein the second fibre channel switch is coupled to the host and the first fibre channel switch is coupled to the tape device.

24. The system of claim 23, wherein the first and second fibre channel switches are connected through a fibre channel over IP tunnel.

25. The system of claim 19, wherein the second read command is generated after the first fibre channel switch determines that the corresponding data block would not cause the flow of data to the second fibre channel switch to exceed a predetermined buffering level.

* * * * *

UNITED STATES PATENT AND TRADEMARK OFFICE
CERTIFICATE OF CORRECTION

| | | |
|---|---|---|
| PATENT NO. | : 8,069,270 B1 | Page 1 of 1 |
| APPLICATION NO. | : 11/220490 | |
| DATED | : November 29, 2011 | |
| INVENTOR(S) | : Manali Holankar et al. | |

It is certified that error appears in the above-identified patent and that said Letters Patent is hereby corrected as shown below:

Title Page, Item (12) "Nambiar et al." should read -- Holankar et al. --

Title Page, Item (75) Inventors: "Manali Nambiar, San Diego, CA (US)" should read -- Manali Holankar, San Diego, CA (US) --

Signed and Sealed this
Seventeenth Day of April, 2012

David J. Kappos
*Director of the United States Patent and Trademark Office*